US008068785B2

(12) United States Patent
Ahn et al.

(10) Patent No.: US 8,068,785 B2
(45) Date of Patent: Nov. 29, 2011

(54) METHOD FOR RESOURCE PARTITION, ASSIGNMENT, TRANSMISSION AND RECEPTION FOR INTER-CELL INTERFERENCE MIGRATION IN DOWNLINK OF OFDM CELLULAR SYSTEMS

(75) Inventors: Jae-Young Ahn, Daejeon (KR); Hee-Soo Lee, Daejeon (KR); Jae-Kyun Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 784 days.

(21) Appl. No.: 12/065,987

(22) PCT Filed: Sep. 6, 2006

(86) PCT No.: PCT/KR2006/003539
§ 371 (c)(1),
(2), (4) Date: Aug. 6, 2008

(87) PCT Pub. No.: WO2007/029965
PCT Pub. Date: Mar. 15, 2007

(65) Prior Publication Data
US 2009/0069023 A1    Mar. 12, 2009

(30) Foreign Application Priority Data

Sep. 6, 2005 (KR) .................. 10-2005-0082889
Oct. 13, 2005 (KR) .................. 10-2005-0096663

(51) Int. Cl.
*H04B 1/00* (2006.01)
(52) U.S. Cl. ........... 455/63.1; 455/67.13; 455/561; 455/447; 455/464; 455/501; 370/329; 370/331; 370/332
(58) Field of Classification Search .......... 455/446–447, 455/450–453, 63.1, 67.13, 561, 501; 370/329, 370/332, 331
See application file for complete search history.

(56) References Cited

U.S. PATENT DOCUMENTS
4,670,889 A * 6/1987 Hewitt .................... 375/356
(Continued)

FOREIGN PATENT DOCUMENTS
KR    1020050048261    5/2005
(Continued)

OTHER PUBLICATIONS
International Search Report PCT/KR2006/003539 Dated Dec. 15, 2006.
(Continued)

*Primary Examiner* — Nick Corsaro
*Assistant Examiner* — Babar Sarwar
(74) *Attorney, Agent, or Firm* — Kile Park Goekjian Reed & McManus PLLC

(57) ABSTRACT

A resource division, allocation, and transmitting/receiving method of downlink for reducing inter-cell interference in an orthogonal frequency division multiplexing system are provided. Entire downlink radio resources are divided into a traffic resource group for a traffic channel and a control resource group for a control channel, the traffic resource group is divided into a first traffic resource group for the intra-cell mobile terminals and a second traffic resource group for a cell-boundary mobile terminal, and a part of the first traffic resource group is imaginarily divided into a (1–1)-th preliminary traffic resource group, the (1–1)-th preliminary traffic resource group being a preliminary resource group for the cell-boundary mobile terminal. The control resource group is allocated to a control channel for the intra-cell mobile terminal; and a resource of the first traffic resource group or the second traffic resource group is allocated to a traffic channel for the mobile terminal according to inter-cell interference affected to the mobile terminal. Radio resources may be reused in each downlink cell of the OFDM system, the traffic may be rapidly transmitted to the cell boundary mobile terminal, a system capacity may be increased, the cell plane may be easily performed, and the system capacity may not be decreased although the mobile terminal number, locations, and traffic density is not uniform.

36 Claims, 12 Drawing Sheets

U.S. PATENT DOCUMENTS

| | | | | |
|---|---|---|---|---|
| 5,341,397 | A | * | 8/1994 | Gudmundson ............... 370/335 |
| 6,088,326 | A | * | 7/2000 | Lysejko et al. ............... 370/209 |
| 6,160,791 | A | * | 12/2000 | Bohnke .......................... 370/208 |
| 6,493,331 | B1 | | 12/2002 | Walton et al. |
| 6,947,748 | B2 | * | 9/2005 | Li et al. ........................ 455/450 |
| 6,985,700 | B1 | * | 1/2006 | Laakso et al. ............... 455/63.1 |
| 6,985,741 | B2 | * | 1/2006 | Palenius ........................ 455/453 |
| 7,039,441 | B1 | * | 5/2006 | Reudink et al. ............. 455/562.1 |
| 7,342,882 | B2 | * | 3/2008 | Kwon et al. .................. 370/232 |
| 7,355,962 | B2 | * | 4/2008 | Li et al. ........................ 370/208 |
| 7,573,850 | B2 | * | 8/2009 | Li et al. ........................ 370/329 |
| 7,613,157 | B2 | * | 11/2009 | Pan et al. ...................... 370/341 |
| 7,773,947 | B2 | * | 8/2010 | Gerlach ........................ 455/63.1 |
| 2003/0013451 | A1 | | 1/2003 | Walton |
| 2004/0127223 | A1 | | 7/2004 | Li et al. |

FOREIGN PATENT DOCUMENTS

| | | |
|---|---|---|
| KR | 1020060064459 | 6/2006 |
| WO | 2005050873 | 6/2005 |

OTHER PUBLICATIONS

Written Opinion PCT/KR2006/003539 Dated Dec. 15, 2006.
Heesoo Lee, ETRI Proposal, heelee@etri.re.kr.
TSG-RAN WG1 Ad Hoc on LTE, R1-050599 Sophia Antipolis, Interference mitigation-Considerations and Results on Frequency Reuse, Jun. 20-21, 2005, pp. 1-5.
3GPP TSG RAN WG1 #37, R1040572, OFDM with interference control for improved HSDPA coverage, May 10-14, 2004, pp. 1-11.
3GPP TSG RAN WG1 Meeting #42, R1-050808, Inter-cell interference management in practical environments, Aug. 29-Sep. 2, 2005, pp. 1-6.
Heesoo Lee, Technology Overview, Oct. 28, 2005, IEEE C802.20-05/72.

* cited by examiner

METHOD FOR RESOURCE PARTITION, ASSIGNMENT, TRANSMISSION AND RECEPTION FOR INTER-CELL INTERFERENCE MIGRATION IN DOWNLINK OF OFDM CELLULAR SYSTEMS

BACKGROUND OF THE INVENTION (a) Field of the Invention

The present invention relates to a resource division, allocation, and transmitting/receiving method of downlink for reducing inter-cell interference in an orthogonal frequency division multiplexing system. More particularly, the present invention relates to a resource division, allocation, and transmitting/receiving method of downlink using an inter-cell interference eliminating scheme in an orthogonal frequency division multiplexing (hereinafter, referred to as "OFDM") system, and a method for improving a system capacity and a data transmission speed of a cell-boundary mobile terminal using the same.

(b) Description of the Related Art

As electronic/communication technology has been rapidly developed, a wireless voice communication service and wireless Internet service has been provided using a wireless network. In order to provide such a wireless voice communication service and wireless Internet service, a mobile communication system uses a code division multiple access (CDMA) scheme, a frequency division multiple access (FDMA:) scheme, and a time division multiple access (TDMA) scheme.

When the mobile communication system uses the conventional FDMA or TDMA scheme, the mobile communication system may not use common resources between adjacent cells, and accordingly, a sufficient signal to interference ratio may be obtained. However, there is a problem in that a system capacity may be decreased due to low frequency reuse efficiency. Since such a FDMA or TDMA scheme is mainly designed to provide a voice service at a constant data rate, the system capacity may be increased by increasing the number of available channels of a sufficient signal to interference ratio by means of a power control.

In order to largely increase frequency reuse efficiency of such a FDMA or TDMA scheme, a CDMA-based voice system has been proposed. The CDMA scheme makes an interference amount of each channel to be less changed by averaging interference amounts, and accordingly, wholly more channel may undergo an appropriate interference.

However, as a main mobile communication service has been converted from the voice service of a constant data rate to a packet service of a variable data rate, the orthogonal frequency division multiplexing and multiple access (OFDM/OFDMA) scheme for easily avoiding interference has replaced the CDMA scheme for controlling interference by averaging interferences. However, the OFDM/OFDMA-based mobile communication system has a problem to manage interference between adjacent cells interference.

In the OFDM/OFDMA-based mobile communication system (hereinafter, referred to as 'OFDM system'), the interference is averaged by a frequency hopping is proposed so as to manage such an interference between the adjacent cells interference problem. The frequency hopping spreads a frequency spectrum by hopping a transmit signal from one center frequency to another center frequency.

In the OFDM system, when each cell is designed to use different frequency hopping patterns, the inter-cell interference may be sufficiently averaged in an encoding packet.

As such an inter-cell interference averaging method, PCT published publication No. WO05/050873, entitled "resource partition, physical channel allocation and power allocation method, and a frequency reuse efficiency increasing method using the same in an orthogonal frequency division multiplexing access (OFDMA)-based cellular system" discloses that an interference is eliminated by averaging interferences so as to increase a frequency reuse, an entire resource is divided into a resource space and a resource sub-space, similar traffics are grouped, and the grouped traffics are allocated to one resource space and one resource sub-space. At this time, each resource area averages interference.

Describing this method in detail, in OFDM system, an entire cell is divided into three frequency reuse patterns and one resource space is divided into three resource sub-spaces. Each cell mainly uses one resource sub-space among the three resource sub-spaces to transmit data at a high power, and uses other two resource sub-spaces at a too low power to affect the adjacent cells. In this manner, the inter-cell interference may be averaged in the encoding packet.

Alternately, an inter-cell interference may be reduced by another method of "Interference Migration Considerations and Results on Frequency Reuse" (2005.6) by Siemens published in a 3GPP RAN WG1 Ad Hoc on LTE conferences. This paper proposes that a first reuse frequency is used between intra-cell mobile terminals and a second reuse frequency is used between cell-boundary mobile terminals. At this time, the intra-cell mobile terminals use some common resource among entire resources, and the cell-boundary terminals use other three-divided resources at each cell.

However, such a method has a problem in that a resource efficiency is decreased when the cell-boundary mobile terminal shares a resource with the intra-cell mobile terminals of the adjacent cell.

Meanwhile, the inter-cell interference of downlink is managed by decreasing a power of the base station largely affecting the mobile terminal. That is, the mobile terminal performs a communication when the power of the base station is decreased in a direction largely affecting the mobile terminal, and accordingly, it obtains a gain.

Since such an inter-cell interference management of downlink is based on interference directionality and interference convergence, a gain of downlink is small, a cell plane is complex, and resources are run by a plurality of resource group including a plurality of resources. And thus, when a normal cell structure is not provided, the mobile terminal is disposed near to the cell boundary line, or a density of the mobile terminal or traffic is not uniformly provided, a system capacity is decreased.

Accordingly, the OFDM system desires a method for solving an adjacent cell interference of the downlink so as to improve a transmission speed of a cell-boundary mobile terminal and increase a system capability.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a resource division, allocation, and transmitting/receiving method of downlink in OFDM system having advantages of by easily having a cell plane using intra-cell interference eliminating method, and maintaining a system capacity although the mobile terminal is disposed near to the cell boundary line, or a density of the mobile terminal or traffic is not uniformly provided. An exemplary embodiment of the present invention provides a resource division and allocation method for reducing an inter-cell interference of a downlink transmitted from a base station to an intra-cell mobile terminal in an orthogonal frequency division multiplexing (OFDM) cellular system. The resource division and allocation method includes (a) dividing entire downlink radio resources into a traffic resource group for a traffic channel and a control resource group for a control channel;

(b) dividing the traffic resource group into a first traffic resource group for the intra-cell mobile terminals and a second traffic resource group for cell-boundary mobile terminals;

(c) imaginarily dividing a part of the first traffic resource group as a (1–1)-th preliminary traffic resource group, the (1–1)-th preliminary traffic resource group being a preliminary resource group for the cell-boundary mobile terminal;

(d) allocating the control resource group as a control channel for the intra-cell mobile terminal; and (e) allocating a resource of the first traffic resource group or the second traffic resource group as a traffic channel for the mobile terminal according to inter-cell interference affecting the mobile terminal. Another embodiment of the present invention provides a resource transmitting method for transmitting a resource from a base station to a mobile terminal by dividing and allocating a resource so as to reduce an inter-cell interference in an orthogonal frequency division multiplexing (OFDM) cellular system. The resource transmitting method includes (a) dividing entire downlink radio resources into a traffic resource group for a traffic channel and a control resource group for a control channel;

(b) dividing the traffic resource group into a first traffic resource group for the intra-cell mobile terminals and a second traffic resource group for a cell-boundary mobile terminal;

(c) imaginarily dividing a part of the first traffic resource group into a (1–1)-th preliminary traffic resource group, the (1–1)-th preliminary traffic resource group being a preliminary resource group for the cell-boundary mobile terminal;

(d) allocating the control resource group to a control channel for the mobile terminal, and allocating resources of the first and second traffic resource group to a traffic channel of the mobile terminal; and (e) transmitting a transmit data symbol to the mobile terminal using the traffic channel. Yet another embodiment of the present invention provides a data symbol receiving method for a cell-boundary mobile terminal receiving a divided and transmitted data symbol from a base station so as to reduce an inter-cell interference in an orthogonal frequency division multiplexing (OFDM) cellular system. The data symbol receiving method includes (a) receiving a transmit data symbol transmitted from the base station using a traffic channel;

(b) checking a repeat symbol included in the transmit data symbol, and detecting and eliminating inter-cell interference using the repeat symbol; and, (c) detecting the data symbol by combining the detected signals. Yet another embodiment of the present invention provides a recoding medium including a program for dividing, allocating, and transmitting a data symbol to a resource so as to reduce an inter-cell interference in an orthogonal frequency division multiplexing (OFDM) cellular system. The program recoding medium includes a function for dividing downlink-entire radio resources into a traffic resource group for a traffic channel and a control resource group for a control channel;

a function for dividing the traffic resource group into a first traffic resource group for intra-cell mobile terminals and a second traffic resource group for cell-boundary terminals;

a function for imaginarily dividing a part of the first traffic resource group into a (1–1)-th preliminary traffic resource group as a preliminary resource group for the cell-boundary mobile terminals;

a function for allocating the control resource group as a control channel for the mobile terminal and allocating a resource of the first traffic resource group or the second traffic resource group to the traffic channel for the mobile terminal; and a function for transmitting a transmit data symbol to the mobile terminal using the traffic channel.

Yet another embodiment of the present invention provides a recoding medium including a program for a mobile terminal receiving a data symbol divided and transmitted so as to reduce an inter-cell interference in an orthogonal frequency division multiplexing (OFDM) cellular system, the program recoding medium includes a function for receiving a transmit data symbol transmitted from the base station using a traffic channel;

a function for checking a repeat symbol included in the transmit data symbol, and detecting and eliminating inter-cell interference using the repeat symbol; and a function for detecting the data symbol by combining the detected signals.

Yet another embodiment of the present invention provides a radio resource structure for reducing an inter-cell interference of a downlink from a base station to an intra-cell mobile terminal in an orthogonal frequency division multiplexing (OFDM) cellular system, the radio resource structure includes a first traffic resource group for transmitting a traffic channel to the intra-cell mobile terminals;

a second traffic resource group for transmitting a traffic channel to the cell-boundary mobile terminal; and, a control resource group for transmitting a control channel to the intra-cell mobile terminals.

DETAILED DESCRIPTION OF THE EMBODIMENTS

Figure 1:
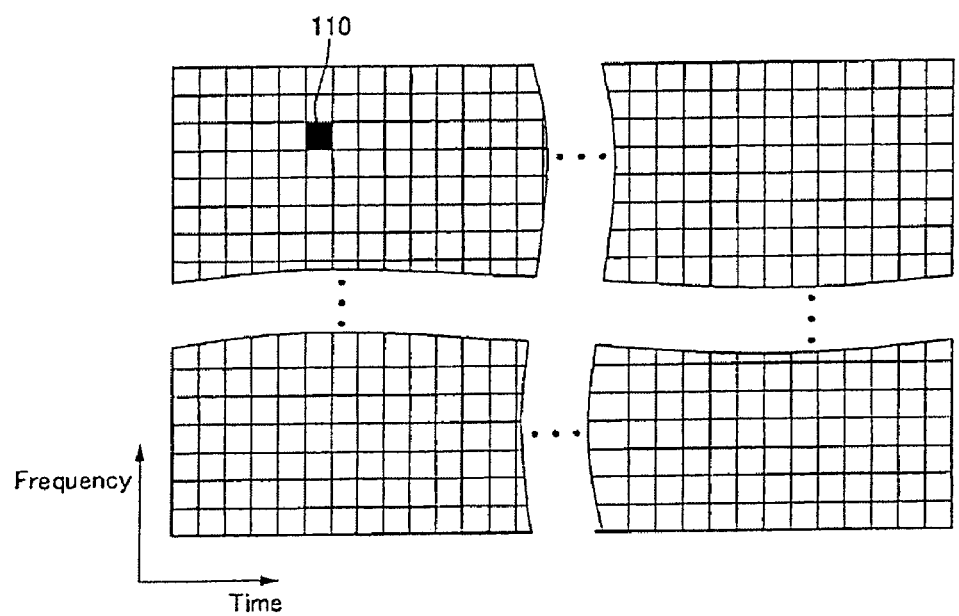
FIG. 1 schematically illustrates a radio resource structure in OFDM system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

FIG. 1 schematically illustrates a radio resource structure of OFDM system according to an exemplary embodiment of the present invention, In an OFDM system, a radio resource is divided into a plurality of unit radio resources 110 based on a time axis and a frequency axis. The unit radio resource 110 is one sub-carrier disposed in an OFDM symbol. The unit radio resource is properly allocated as a control channel and a traffic channel.

Figure 2:
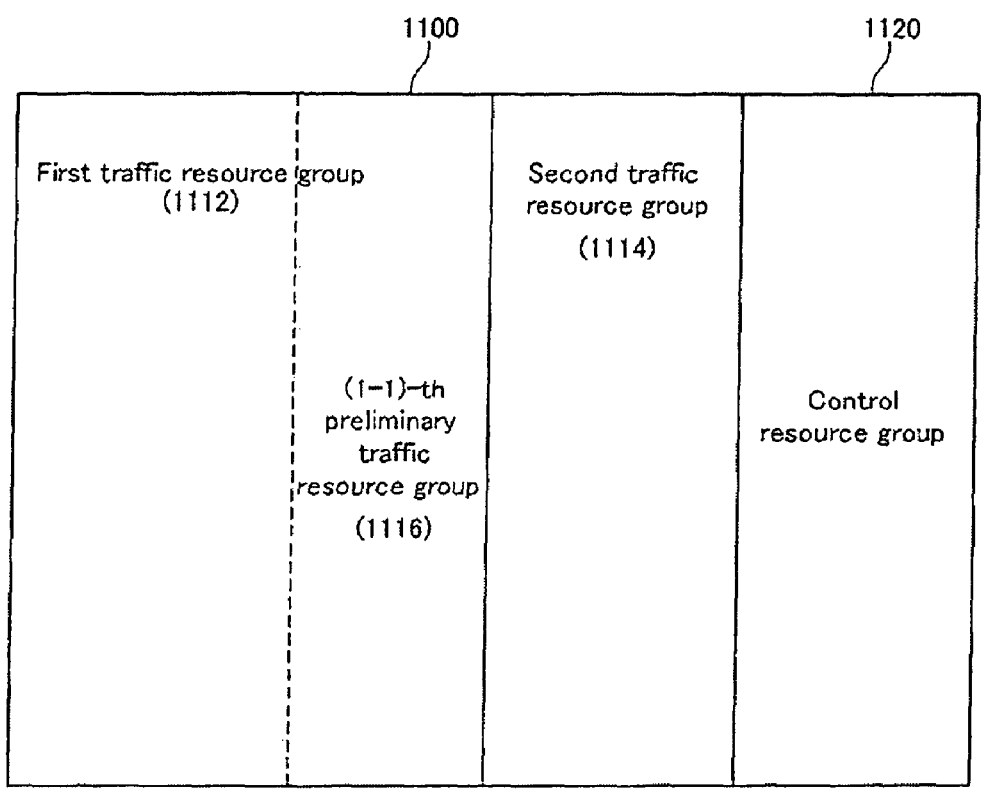
FIG. 2 illustrates a radio resource structure divided into a resource group unit in an OFDM system according to an exemplary embodiment of the present invention.

FIG. 2 illustrates a radio resource structure divided into a resource group unit in an OFDM system according to an exemplary embodiment of the present invention.

According to an exemplary embodiment of the present invention, in the OFDM system, the radio resources are divided into a two resource group, that is, a resource group (hereinafter, called as 'traffic resource group') 1100 for a traffic channel and a resource group (hereinafter, called as 'control resource group') 1120 for a control channel.

The traffic resource group 1100 is again divided into a first traffic resource group 1112 allocated as a physical channel to a mobile terminal disposed in a cell (hereinafter, called as "intra-cell mobile terminal") and a second traffic resource group 1114 for a mobile terminal largely undergone an interference between adjacent cells (hereinafter, called as "inter-cell interference). In addition, a part of the first traffic resource group 1112 is divided into a preliminary resource group (hereinafter, called as 'a (1–1)-th preliminary traffic resource group') 1116 of the second traffic resource group 1114.

The (1–1)-th preliminary traffic resource group 1116 is a dummy resource group dealt as the first traffic resource group, until before it is divided and used as the second traffic resource group 1114 for the mobile terminal largely undergone an inter-cell interference.

The base station allocates a resource from the first traffic resource group 1112 or the second traffic resource group 1114 as a physical resource of the corresponding mobile terminal according to an amount of inter-cell interference of each mobile terminal.

Figure 3:
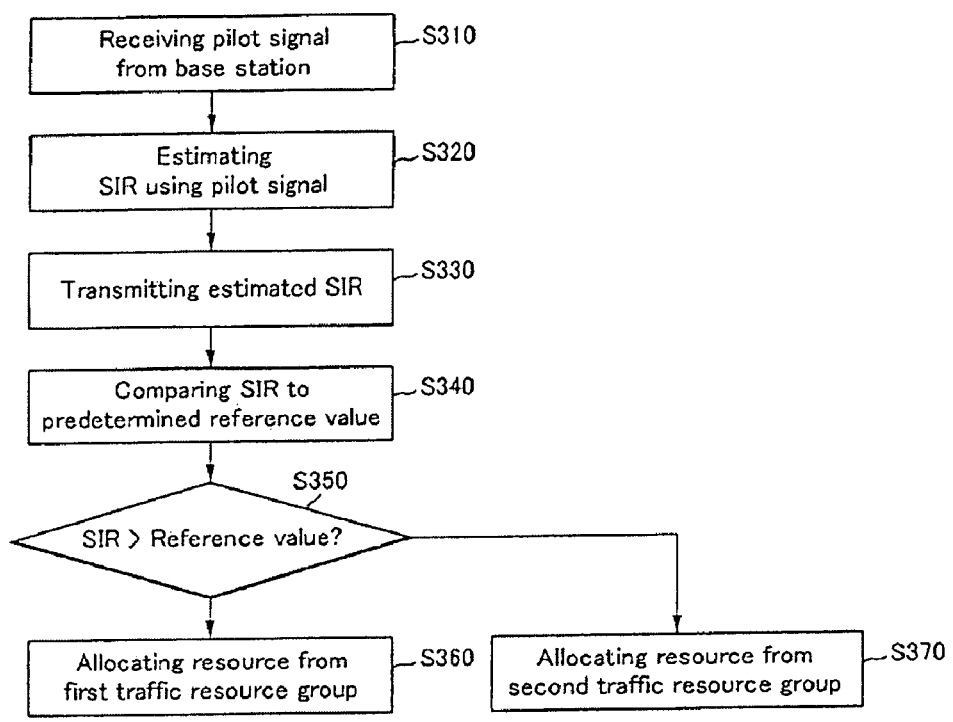
FIG. 3 is a flowchart showing how to allocate a traffic resource group according to a mobile terminal location in each cell.

FIG. 3 is a flowchart showing how to allocate a traffic resource group according to a mobile terminal location in each cell.

The intra-cell mobile terminal receives a pilot signal etc. from the base station (S310) and calculates a signal to interference ratio (SIR) and a receive noise power using the received pilot signal etc. (S320).

The intra-cell mobile terminal reports the calculated SIR and the received receive noise power to the base station of the corresponding cell. On reporting the calculated SIR and the received receive noise power, the intra-cell mobile terminal may directly transmit the same to the base station and may transmit the converted equivalent information thereto (S330).

The base station compares the SIR to the predetermined standard value using information received from all the mobile terminals. The predetermined standard value is previously given by a mobile communication service provider (S340).

When it is determined that the SIR is greater than the predetermined standard value, the resource of the first traffic resource group 1112 is allocated to the traffic channel (S350), and when it is determined that the SIR is less than the predetermined standard value, the resource of the second traffic resource group 1114 is allocated to the traffic channel (S360).

Generally, since the intra-cell mobile terminal has a relatively large SIR, the first traffic resource group 1112 is allocated, and since the mobile terminal disposed at a boundary portion of the cell (hereinafter, called "cell-boundary mobile terminal") has a relatively small SIR, the second traffic resource group 1114 is allocated.

Figure 4:
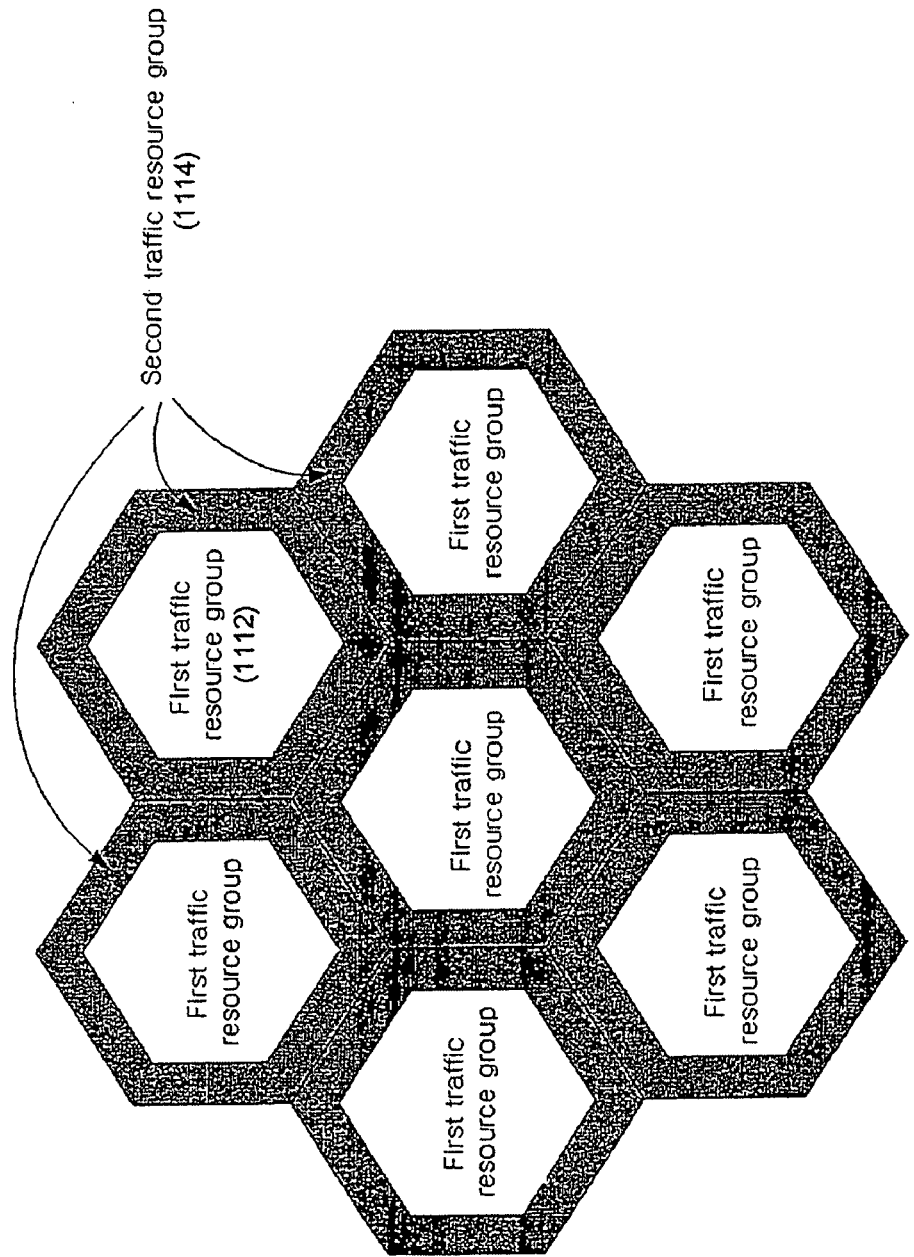
FIG. 4 illustrates a cell having a traffic resource group allocated according to a mobile terminal location.

Accordingly, as shown in FIG. 4, the first traffic resource group 1112 is allocated to the inner portion of the cell and the second traffic resource group 1114 is allocated to the boundary portion thereof.

Each cell may independently divide the first traffic resource group 1112 regardless of the adjacent cells and allocate the resource from the first traffic resource group 1112 as a physical channel of each mobile terminal, may allocate a resource in a format for averaging an inter-cell interference, and may allocate a resource in a format for reducing an inter-cell interference.

Each physical channel formed by the resources of the first traffic resource group 1112 uses a transmit power and a modulation and encoding method selected considering an inter-cell interference strength and a signal-to-noise ratio (SNR) affecting the corresponding mobile terminal. At this time, each physical channel may use a channel gain or a receive noise power to select the transmit power and the modulation and encoding method, instead of the inter-cell interference strength.

The resources of the second traffic resource group 1114 are divided into a plurality of unit resource groups. How to divide the second traffic resource group 1114 into the unit resource group will be described in detail with reference to FIG. 6.

Figure 5:
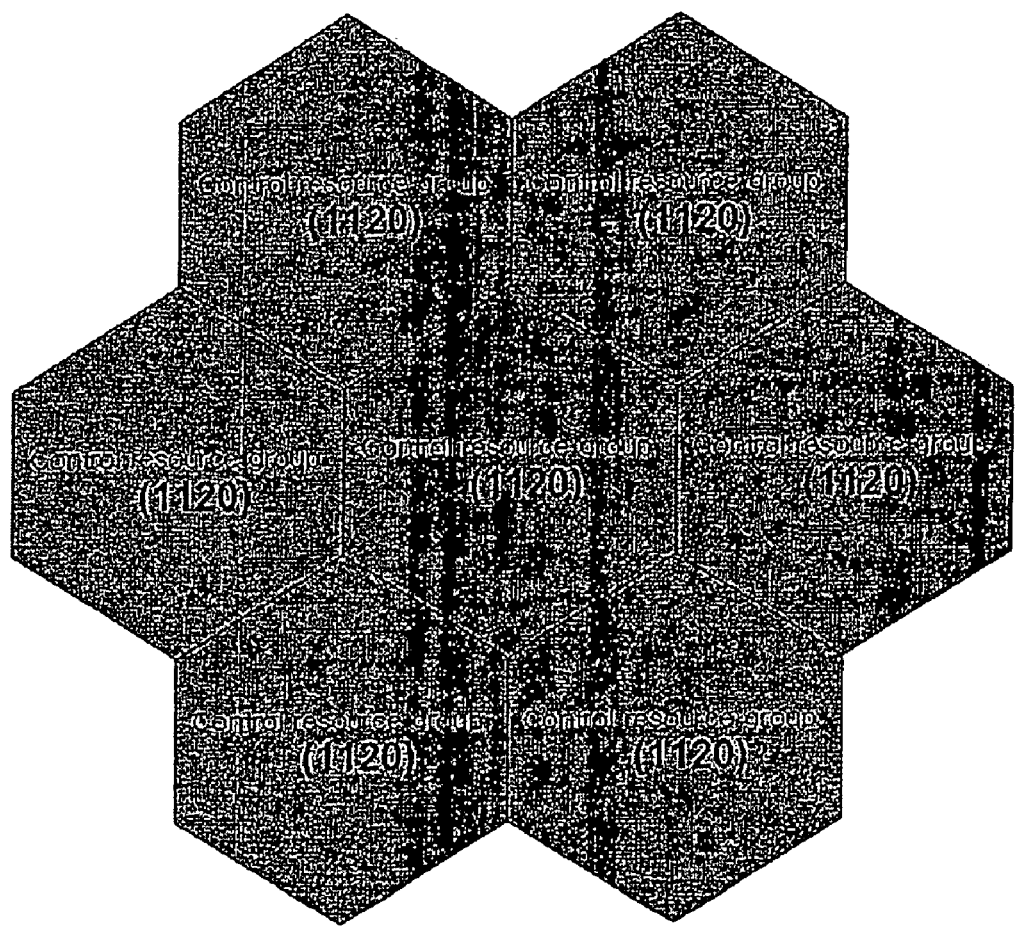
FIG. 5 shows how to provide a control resource group for a control channel in each cell.

Firstly, FIG. 5 shows how to provide a control resource group for a control channel in each cell.

The control resource group 1120 is not affected by the inter-cell interference strength and the SNR, but uniformly divided and allocated regardless of a location of the intra-cell mobile terminal. Accordingly, the control resource group 1120 is allocated and used in an entire cell as shown in FIG. 4.

Figure 6:
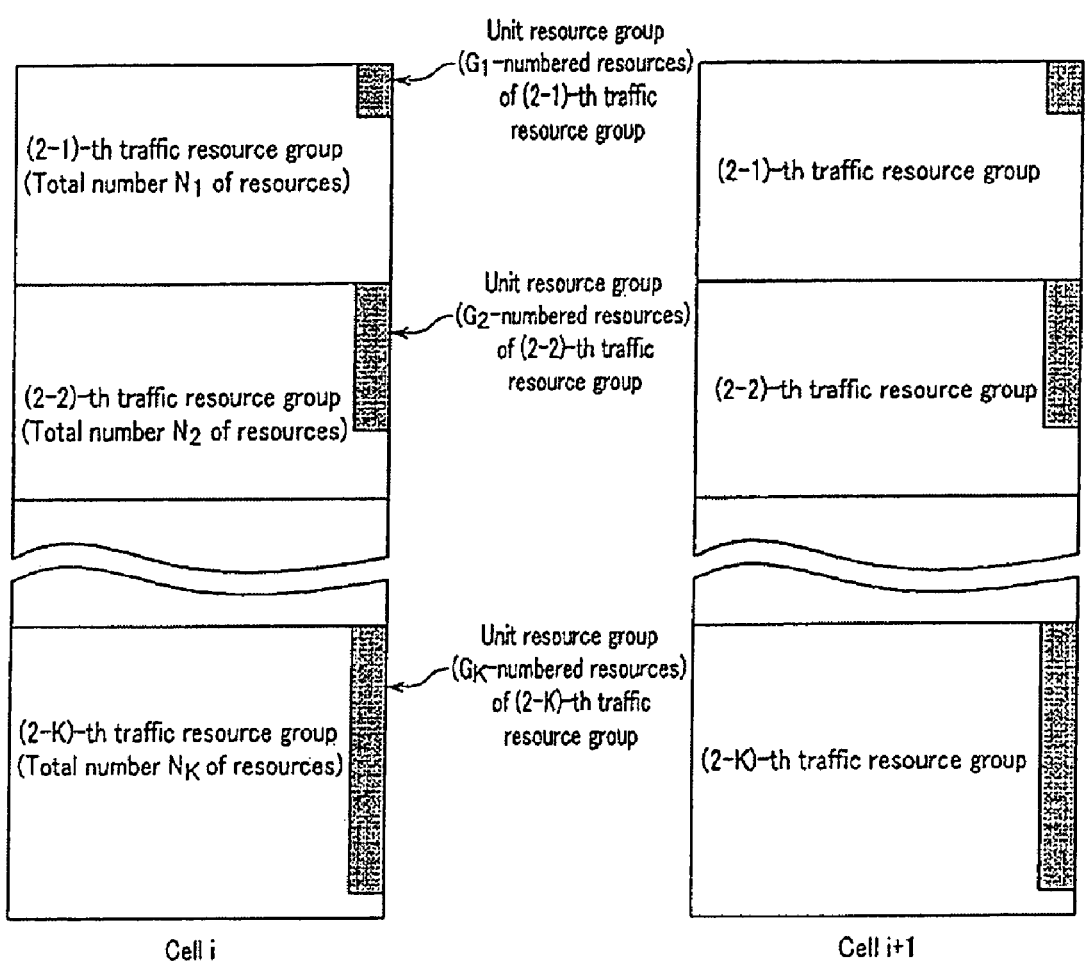
FIG. 6 shows how to divide a second traffic resource group and how to configure a unit resource group.

FIG. 6 shows how to divide a second traffic resource group and to configure a unit resource group.

The second traffic resource group is divided into a (2–1)-th traffic resource group, a (2–2)-th traffic resource group, . . . , a (2–K)-th traffic resource group in all the cell. The each resource group has each resource number of N1, N2, . . . , NK.

The (2–K)-th traffic resource group is configured as a unit resource group having GK-numbered resources disposed at the same frequency and the same time in all the cell. Herein, NK is given as a total resource number of the (2–K)-th traffic resource group, and GK is given as the number of the unit group resources in the (2–K)-th traffic resource group. As a result, the (2–K)-th traffic resource group is formed by NK/GK numbered unit resource group.

As show in FIG. 6, in the second traffic resource group allocated to the I-th cell (cell i), the (2–1)-th traffic resource group has a total of N1 numbered resources and the unit group resource has G1 numbered resources, the (2–2)-th traffic resource group has a total of N2 numbered resources and the unit group resource has G2 numbered resources, and the (2–K)-th traffic resource group has a total of NK numbered resources and the unit group resource has GK numbered resources.

In addition, the second traffic resource group allocated to the (I+1)-th cell (cell i+1) is divided into the (2–1)-th traffic resource group to the (2–K)-th traffic resource group, and the (2–1)-th traffic resource group to the (2–K)-th traffic resource group respectively has the same unit resource group at the same location as that of the (2–1)-th traffic resource group to the (2–K)-th traffic resource group of the I-th cell.

Herein, a repeat symbol repeated in the second traffic resource group is used so as to configure the GK numbered resources as a unit group. The unit group may be formed in three manners.

Figure 7:
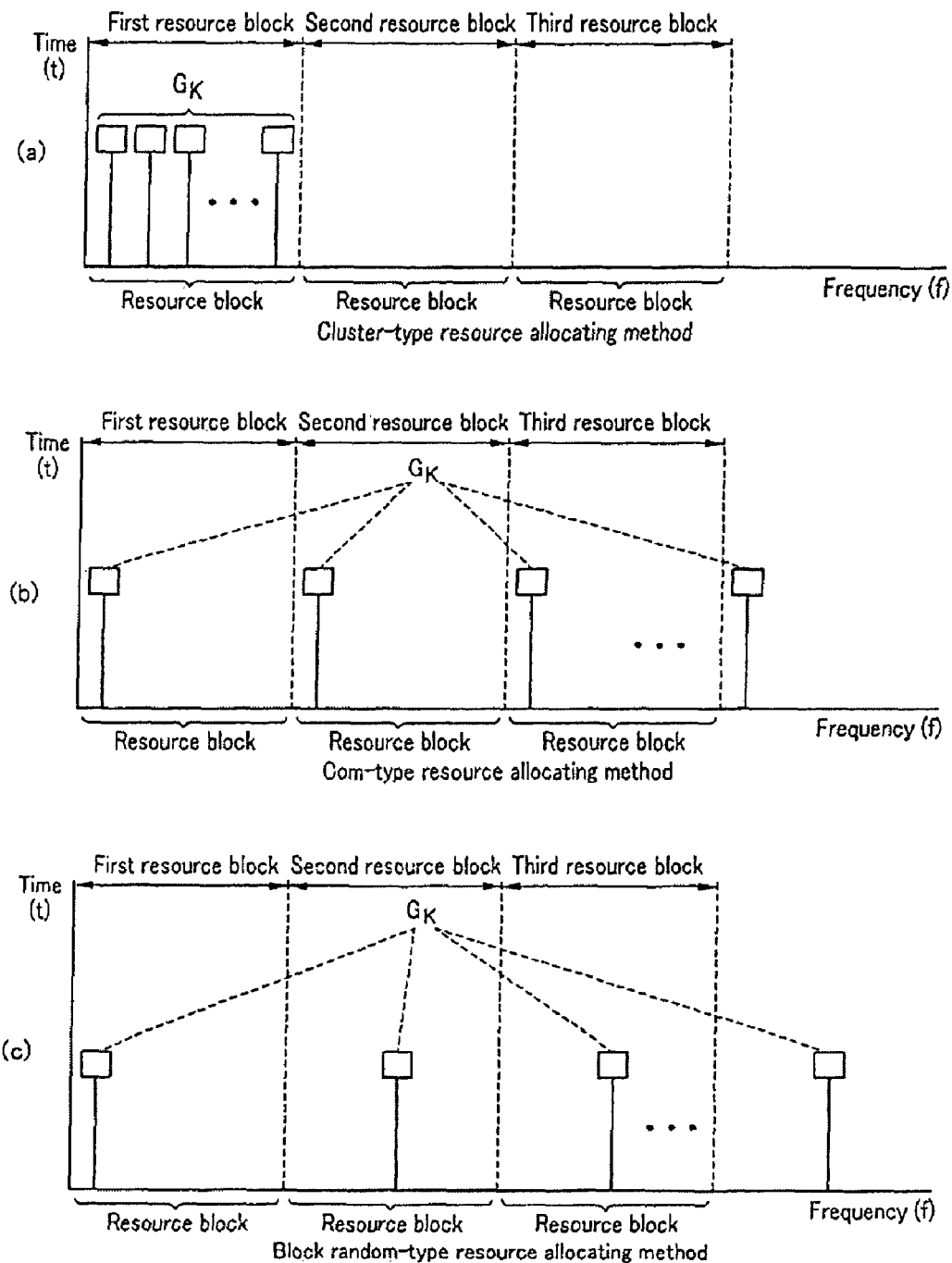
FIG. 7 shows how to configure one unit resource group with GK-numbered resources on a frequency axis.

FIG. 7 shows how to configure one unit resource group with GK-numbered resources on a frequency axis, According to an exemplary embodiment of the present invention, the unit group may be formed using a cluster-type resource allocation method, com-type resource allocation method, and a block random-type resource allocation method.

According to the cluster-type resource allocation method, the NK numbered resources are divided into a few of consecutive resource groups on the frequency axis or the time axis and the divided resource groups are formed as a plurality of resource blocks. At this time, as shown in a (c) of FIG. 7, the unit resource group is formed by the GK numbered resources of in the same resource block.

According to the com-type resource allocation method and the block random-type resource allocation, the NK numbered resources are divided into a few of consecutive resource groups on the frequency axis or time axis and the divided resource groups are formed as a plurality of resource blocks. And then, the unit resource group is formed by the GK numbered resources maximum uniformly disposed on the frequency axis or the time axis such that a channel response relation ratio between the cell and each mobile terminal is minimized and the maximum frequency and time diversity of the corresponding cell is obtained. At this time, the com-type resource allocation method includes forming a unit resource group by extracting the GK-numbered resources of the same location in each the com-type resource allocation method as shown in (b) of FIG. 7, and the block random-type resource allocation includes forming a unit resource group by extracting the GK-numbered resources in random locations of each resource block as shown in (c) of FIG. 7.

The base station may form one unit resource group with the GK-numbered resources in this manner and transmit traffic data to the mobile terminal using the formed unit resource group.

In the OFDM system, when the whole band is run by one resource, or the whole band is run by a plurality of divided sub-bands and a physical channel resource is allocated to the each terminal, the physical channel resource being formed as sub-carriers of the corresponding sub-band by being coupled to a predetermined sub-band, a traffic resource group appropriate for a channel characteristic of the corresponding mobile terminal is selected from the second traffic resource group of in the whole band or the predetermined sub-band, and the desired number of unit resource groups having a large average distance on the frequency axis and the time axis are allocated to the physical channel such that an more encoding gain may be obtained in the selected traffic resource group.

However, when the whole band is divided and operated by a plurality of sub-bands and a physical channel resource is allocated to the each terminal coupled to a predetermined sub-band, the physical channel resource being formed by sub-carriers of in the corresponding sub-band, a traffic resource group appropriate for a channel characteristic of the corresponding mobile terminal is selected from the second traffic resource group of in the whole band or the predetermined sub-band, and the unit resource groups having a large average distance on the frequency axis and the time axis are allocated to the physical channel by the necessary number such that an encoding gain is more obtained in the selected traffic resource group.

Figure 8:
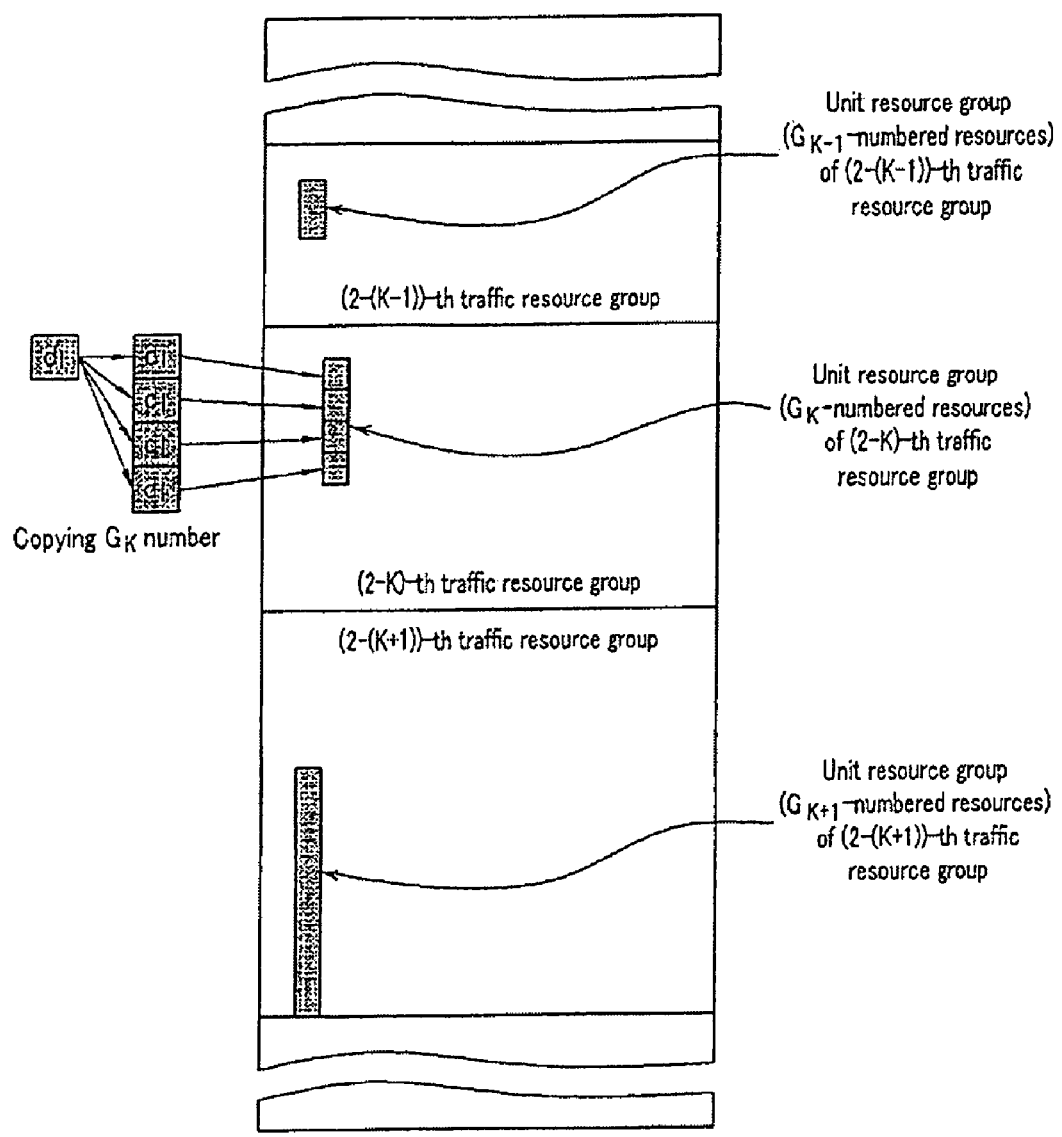
FIG. 8 shows how to divide and allocate resources of a second traffic resource group to a physical channel according to an exemplary embodiment of the present invention.

FIG. 8 shows how to divide and allocate resources of a second traffic resource group to a physical channel according to an exemplary embodiment of the present invention, In order to transmit data to the each mobile terminal using the physical channel resource formed by the second traffic group resource, firstly, a data symbol d1 transmitted from the base station to the predetermined mobile terminal is copied by the number of to-be used resources of the unit resource group of the second traffic resource group. When the base station transmits data to the predetermined mobile terminal using the (2–K)-th traffic resource group, the data symbol is copied by the GK, and the coped GK numbered data symbol are transmitted using the predetermined GK resources among the resources allocated to the (2–K)-th traffic resource group.

When there is no sufficient resource in the (2–K)-th traffic resource group although the (2–K)-th traffic resource group is selected as a traffic resource group appropriate for a channel characteristic of the corresponding mobile terminal, resources are allocated from other traffic resource groups to the mobile terminal.

Figure 9:
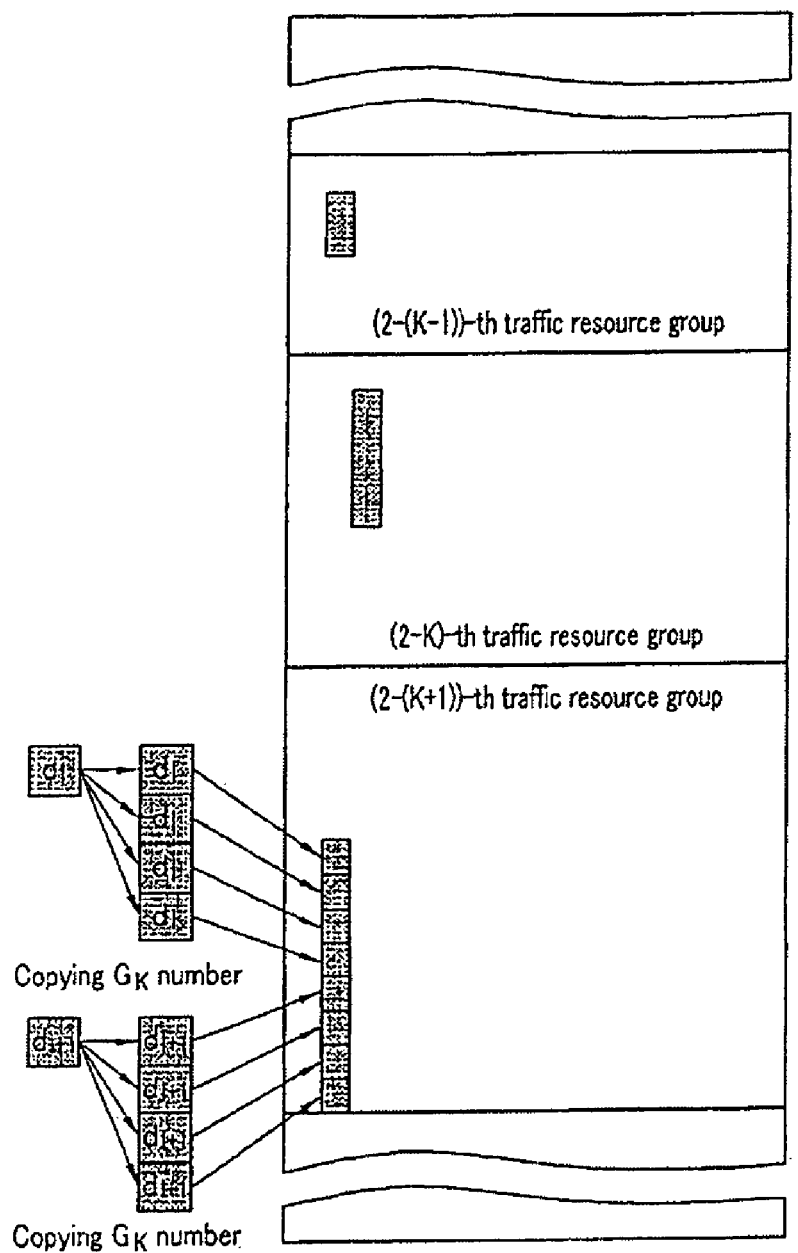
FIG. 9 shows how to allocate and transmit a resource from other second traffic resource group when there is no sufficient resource in a second traffic resource group according to an exemplary embodiment of the present invention.
Figure 10:
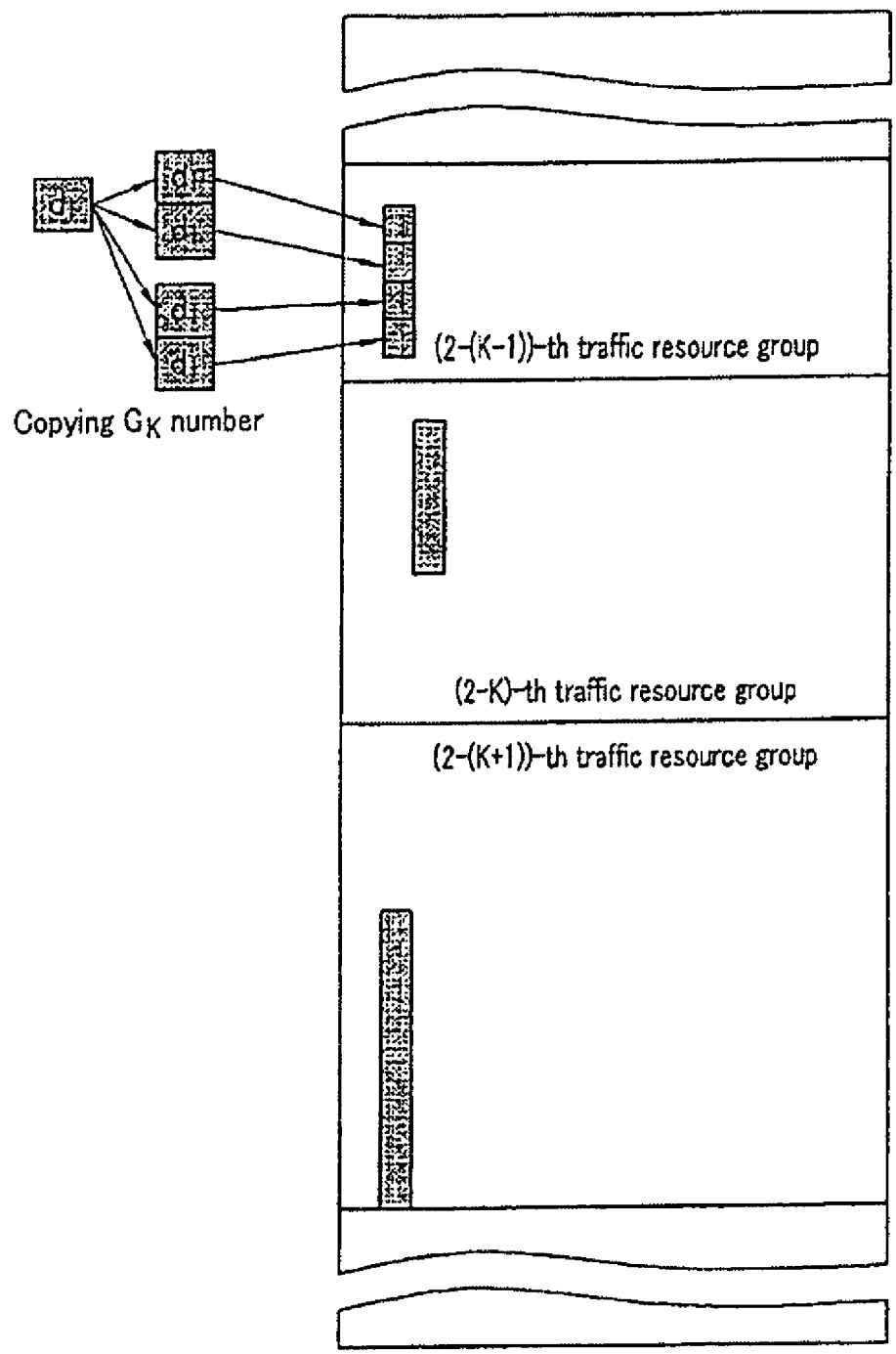
FIG. 10 shows how to allocate and transmit a resource from other second traffic resource group when there is no sufficient resource in a second traffic resource group according to another exemplary embodiment of the present invention.

FIG. 9 shows how to allocate and transmit a resource from other second traffic resource group when there is no sufficient resource in a second traffic resource group according to an exemplary embodiment of the present invention, FIG. 10 shows how to allocate and transmit a resource from other second traffic resource group when there is no sufficient resource in a second traffic resource group according to another exemplary embodiment of the present invention.

When there is no sufficient resource in the (2–K)-th traffic resource group appropriate for a channel characteristic of the corresponding mobile terminal, the base station allocates a part of the resources of other traffic resource groups. When a traffic resource group for allocating a part of the resources is defined as a (2–J)-th traffic resource group, the transmission method may be differed according to a location of the (2–J)-th traffic resource group and the (2–K)-th traffic resource group.

In addition, the (2–J)-th traffic resource group may be differently transmitted according to a magnitude of the GK corresponding to the number of resources of the (2–K)-th traffic resource group and a magnitude of the GJ corresponding to the number of resources of the (2–J)-th traffic resource group.

FIG. 9 illustrates a resource allocation method in case of GK<GJ wherein the (2–J)-th traffic resource group is consecutive to the (2–K)-th traffic resource group and J=K+1.

First, since there is no sufficient resource in the (2–K)-th traffic resource group appropriate for a channel characteristic of the corresponding mobile terminal, a part of the resources of the (2–(K+1))-th traffic resource group is allocated. And then, since GK<GK+1, the unit resource group allocated to the (2–(K+1))-th traffic resource groups is divided by GK+1/GK so as to have GK numbered resources, and accordingly, the divided resource group is used to transmit the GK numbered repeat symbols. In FIG. 9, the GK is given as 4, the GK+1 is given as 8, and a traffic data d1 to be transmitted by the (2–K)-th traffic resource group is transmitted using a resource of the (2–(K+1))-th traffic resource group.

FIG. 10 illustrates how to allocate a resource when the (2–K)-th traffic resource group is consecutive to the (2–J)-th traffic resource group, GK>GJ, wherein J=K–1.

First, since there is no sufficient resource in the (2–K)-th traffic resource group appropriate for a channel characteristic of the corresponding mobile terminal, a part of the resources of the (2–(K–1))-th traffic resource group is allocated. And then since GK>GK–1, the Gk numbered repeat symbols are divided by a magnitude of (GK–1), and data are transmitted (GK/GK–1) numbered unit resource groups having the (GK–1)-numbered resources from the (2–(K–1))-th traffic resource groups.

In FIG. 10, the GK is given as 2, the GK–1 is given as 2, and a traffic data d1 to be transmitted using the resource of (2–K)-th traffic resource group is divided by 2 and the divided traffic data are transmitted respectively using a resource of the (2–(K–1))-th traffic resource groups.

In this case, since the (GK–1) numbered resources receive the same symbol, there is no loss between adjacent cells and the GK repeat symbol may be transmitted by respectively eliminating interference by the (GK–1) numbered resources and combining the eliminated.

Each physical channel formed by the divided second traffic resource group may eliminate the inter-cell interference. Accordingly, the desired transmit power may be increased within the maximum transmit power of the transmit amplifier of the base station so as to increase a data rate without considering an increase of interference on the adjacent cell. Meanwhile, the modulation and encoding scheme is selected considering the SNR or a transmit power, a channel gain and a receive noise strength to affect the corresponding mobile terminal, and $G_K$ of the (2–K)-th traffic resource group selected to be appropriate for the channel state of the mobile terminal.

Meanwhile, the (1–1)-th preliminary traffic resource group forms a symbol-repeated data channel resource in the same format as the second traffic resource group. However, the (1–1)-th preliminary traffic resource group is imaginarily provided until before the (1–1)-th preliminary traffic resource group is divided into resource groups for the mobile terminal undergone a large inter-cell interference (hereinafter called "a large inter-cell interference mobile terminal") by means of the negotiation of between the base stations. When a part or an entire of the (1–1)-th preliminary traffic resource group is divided into and allocated as a plurality of resource groups for the large inter-cell interference mobile terminal by means of the negotiation between the base stations, the same shaped channel resource as the second traffic resource group is formed. At this time, in the same manner as the second traffic resource group, the resources are allocated to the physical channel, and the data symbols are transmitted from the base station to the mobile terminal.

In addition, when there is no sufficient resources in the second traffic resource group, the resources of the first traffic resource group are allocated and the transmit power is limited so as to suppress the inter-cell interference. At this time, it is preferable that the resources of the first traffic resource group are allocated to the mobile terminals of near to a cell center even among the cell-boundary mobile terminals. Since there is no sufficient resources in the (2–K)-th traffic resource group, the data are transmitted method using the same method as the resource allocation method of FIG. 10.

The lower the channel response correlation diagram of the $G_K$-numbered repeat symbols between the adjacent cells and the mobile terminal is, the more the receipt performance is increased. In addition, in order to reduce an effective channel response correlation diagram of the repeat symbols, a predetermined weight value is multiplied to the transmit data symbol stream. In this manner, the effective channel response of each data symbol is given as a product of the physical channel gain (h) and the weight value (c) of the corresponding symbol. Accordingly, the lower the inter-cell correlation diagram of such an effective channel response is, the more the receiving performance is improved.

A weight value row multiplied so as to decrease the inter-cell effective channel correlation diagram is logically different from a scramble code used to randomize the inter-cell signals in the conventional OFDM system.

Particularly, in case of the mobile terminal disposed on the sector boundary, since the channel response correlation diagram of the repeat symbols between the adjacent sectors and the mobile terminal may be greater than the channel response correlation diagram of the adjacent cells. Accordingly, the transmit data symbol stream of each sector is multiplied by enough a weight value row considering this point that the channel response correlation diagram of the repeat symbols between the adjacent sectors is minimized and accordingly, the receiving performance may be maximized under the inter-sector interference environment.

When G-numbered repeat symbols are transmitted using a sub-carrier of in one OFDM symbol in the OFDM system and it is assumed that the adjacent cell has $N_C$ numbered resources, the mobile terminal receives an OFDM signal expressed as Equation 1 with respect to the data transmitted using a data channel resource of the second traffic resource group.

$$Y(n) = \sum_{i=1}^{N_c} H_i(n)X_i(n) + N_w(n), \qquad \text{(Equation 1)}$$

$$n = 0, 1, 2, \ldots, N-1$$

In Equation 1, $X_i(n)$ satisfying $X_1(n)$ and $i \neq 1$ is given as an interference signal of i-th adjacent cell with respect to the transmit signals of the desired cell, $N_c$ is given as a total sub-carrier number of one OFDM symbol, $H_i(n)$ is given as a frequency response of a channel formed between the i-th cell and the terminal, and $N_w(n)$ is given as an additive white Gaussian noise (hereinafter, called 'AWGN') having an average 0 and a variance $\sigma^2$.

When the same data symbol is transmitted to the G-numbered sub-carriers, the OFDM signal according to Equation 1 is expressed as Equation 2.

$$Y(m) = \tilde{H}(m)X(m) + N_w(m), m \in \{0, 1, \ldots, M-1\} \qquad \text{(Equation 2)}$$

In Equation 2, m is given as a resource group index having the G-numbered sub-carriers, M is given as a data symbol number transmitted through the one OFDM symbol, Y(m) is given as a receive signal vector, $\tilde{H}(m)$ is a channel coefficient matrix, X(m) is a transmit signal vector, and $N_w(m)$ is a noise vector. At this time, M, N and G satisfy a relation M=N/G.

The Y(m), $\tilde{H}(m)$, X(m) and $N_w(m)$ are respectively expressed as Equation 3.

$$Y(m)=[Y(J_{m1}),Y(J_{m2}),\ldots,Y(J_{mg})]^T$$

$$\tilde{H}(m)=[\tilde{H}_1(m),\tilde{H}_2(m),\ldots,\tilde{H}_{N_c}(m)]$$

$$X(m)=[X_1(m),X_2(m),\ldots,X_{N_c}(m)]^T$$

$$N_w(m)=[N_w(J_{m1}),N_w(J_{m2}),\ldots,N_w(J_{mg})]^T \quad \text{(Equation 3)}$$

In Equation 3, $J_{mg}$ is given as g-th sub-carrier index of m-th resource group. In Equation 3, m-th signal $X_i(m)$ of i-th user uses a channel formed by $\tilde{H}_i(m)$, and may be received by adding $N_c$-numbered user signals. $J_{mg}$ is determined depending on a type of a resource allocation and is expressed as Equation 4.

(a) $J_{mg}=G\cdot m+g-1$ (b) $J_{mg}=M\cdot(g-1)+m$ (c) $J_{mg}=M\cdot(g-1)+rand(m,g), g\in\{1,\ldots,G\}, J_{mg}\in\{0, 1, \ldots, N-1\}$ (Equation 4)

In Equation 4, rand(m,g) is randomly selected between 0 and M−1, (a) is given as a sub-carrier index of a cluster-type unit resource group, (b) is given as a sub-carrier index of a com-type unit resource group, and (c) is given as a sub-carrier index of a block random-type unit resource group.

A cluster-type sub-carrier index $(J_{mg})$ includes G-numbered adjacent sub-carriers, a com-type sub-carrier index $(J_{mg})$ includes G-numbered sub-carriers spaced by M, a block random-type sub-carrier index $(J_{mg})$ includes G-numbered sub-carriers randomly spaced each other.

In Equation 3, an i-th row vector $\tilde{H}_i(m)$ of $\tilde{H}(m)$ indicates a channel response formed between the i-th cell base station of the m-th resource group and the mobile terminal, expressed as Equation 5.

$$\tilde{H}_i(m)=[H_i(J_{m1}),H_i(J_{m2}),\ldots,H_i(J_{mG})]^T \quad \text{(Equation 5)}$$

It is assumed that $\tilde{H}_i(m)$ vectors are independent each other, a symbol may be detected using a signal detecting method such as a least square method (LS) and a minimum mean square error method (MMSE) as a linear detecting method using a $\tilde{H}(m)$ matrix, as a parallel interference cancellation method (PIC), successive interference cancellation method (SIC), and a maximum likelihood (ML) as a non-linear detecting method. A symbol detecting method using a linear detecting method is expressed as Equation 6.

$$\hat{X}(m)=W(m)Y(m) \quad \text{(Equation 6)}$$

In Equation 6, $\hat{X}(m)$ is given as a transmit signal vector obtained from the symbol detecting method, W(m) is a weight value matrix of the m-th resource, and Y(m) is a receive signal vector. W(m) is given as a $N_c \times G$ matrix, and is expressed as Equation 7 using the least square method.

$$W(m)=\tilde{H}(m)^+=(\tilde{H}(m)^*\tilde{H}(m))^{-1}\tilde{H}(m)^* \quad \text{(Equation 7)}$$

In Equation 7, '+' indicates a pseudo inverse matrix, and '*' indicates a conjugate transpose matrix. In addition, W(m) is expressed as Equation 8 using the minimum mean square error method.

$$W(m)=(\tilde{H}(m)^*\tilde{H}(m)+\sigma^2 I_G)^{-1}\tilde{H}(m)^* \quad \text{(Equation 8)}$$

In Equation 8, $\sigma^2$ indicates a noise power when the transmit power is given as 1, and $I_G$ is given as a G×G unit matrix.

The LS method according to Equation 7 obtains a pseudo inverse matrix of a channel response and nullifies an interference signal without considering noise, and the MMSE method according to Equation 8 considers a noise, such that a demodulation signal has a maximum signal-to-noise ratio (SNR).

When such a symbol detecting method is applied and the inter-cell channel responses of sub-carriers of the G-numbered repeated resource group are correlated, a maximum diversity gain may not be obtained or the interference signal of the adjacent cells or sectors may not be effectively removed. However, when the transmit node transmits a signal multiplied by the weight value row, the effective channel response becomes a product of the physical channel response and the weight value, and accordingly, a performance of the symbol detecting method may be improved.

The weight value multiplied so as to improve a performance of the symbol detecting method is expressed as Equation 9.

$$c_i(n)=\exp(j\pi/4\cdot rand(i,n))rand(i,n)\in\{0,1,\ldots \quad \text{(Equation 9)}$$

In Equation 9, $c_i(n)$ indicates a weight value multiplied to the n-th sub-carrier of the i-th user. In Equation 9, 8-PSK (Phase Shift Keying) weight value is described as one example, and accordingly, rand(i,n) has a random value between 0 and 8. However, various weight values as well as the 8-PSK may be used so as to detect a symbol of the OFDM system according to an exemplary embodiment of the present invention.

Through a cell plane, the resources may be allocated such that the weight values $c_i(n)$ are orthogonal to each other. At this time, since the sub-carrier index of the cluster-type unit resource group has a similar channel response for the respective frequencies, it may more efficiently calculate a weight value.

Instead of using weight value vectors allocated such that they are orthogonal to each other every cell or sector, random orthogonal code such as a Walsh code or discrete Fourier transform (DFT)-based code may be used so as to detect a symbol.

The inter-cell or inter-sector orthogonality must be maintained so as to allocate an orthogonal code. Accordingly, it is necessary to previously perform a cell plan. When the cell plan is performed, the orthogonal codes are allocated only to the inter-cells or the inter-sectors and the weight value calculated in Equation 9 may be multiplied to the orthogonal codes for the brief cell plane.

As such, when the weight value is calculated and the cell plan is performed using the weight value, the effective channel response ($\tilde{H}_{Vi}(m)$) formed between the i-th cell base station of the m-th repeated resource group and the mobile terminal is expressed as Equation 10.

$$\tilde{H}_{Vi}(m)=[c_i(J_{m1})H_i(J_{m1}),c_i(J_{m2})H_i(J_{m2}),\ldots,c_i(J_{mC})H_i(J_{mC})]^T \quad [\text{equation 10}]$$

In Equation 10, when the effective channel response is calculated, the physical channel is not changed but includes a randomly multiplied weight value.

In case of the sub-carrier index of the cluster-type unit resource group, since the sub-carrier channel response ($H_i(J_{mG})$) of one repeat resource group are similar to each other, and accordingly, a performance thereof is decreased. However, when the weight value is multiplied, the effective channel response ($c_i(J_{mG})H_i(J_{mG})$) of the one repeat resource group is independent, and accordingly, the performance thereof may be improved.

When the (2−J)-th traffic resource group is used since there are no sufficient resources in the (2−K)-th traffic resource group appropriate for the channel state of the predetermined mobile terminal according to FIG. 9 and FIG. 10, in case of $G_K > G_J$, the interference cancellation detecting method is performed for $G_K/G_J$-numbered resource groups having $G_J$-numbered resources, and the interference-cancelled signal is detected and then the detected signals are combined, finally, the corresponding symbol detecting is finished. In case of $G_K < G_J$, the interference cancellation detecting method is performed for the respective $G_K$-numbered resource groups and accordingly the corresponding symbol detecting is finished.

In addition, when the (1−1)-th preliminary traffic resource group is divided and allocated since there are no sufficient resources in the second traffic resource group appropriate for the channel state of the predetermined mobile terminal, the symbol is detected using the same method as the symbol detecting method of the second traffic resource group described above.

In addition, when the first traffic resource group is allocated since there are no sufficient resources in the second traffic resource group and the (1−1)-th preliminary traffic resource group, the symbol is detected using a general symbol detecting method such as a MRC (maximum ratio combining) method instead of the symbol detecting method described above.

At this time, the base station may transmit a control resource group through one sub-frame, and may transmit a control resource group by dividing the same through a plurality of sub-frames.

Figure 11:
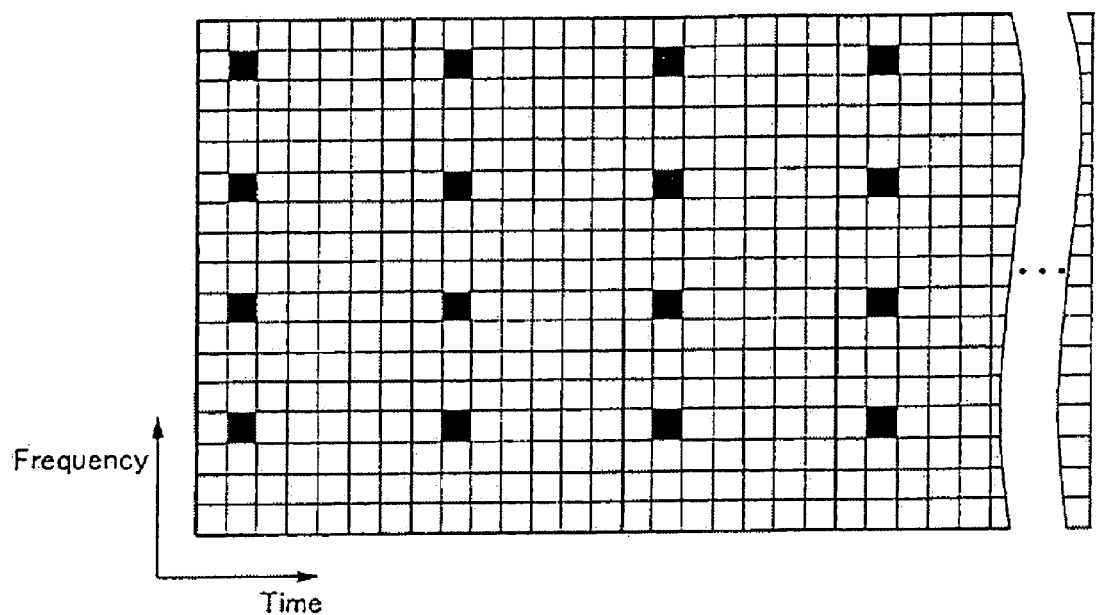
FIG. 11 shows how to divide and transmit a control resource group using a plurality of sub-frames.

FIG. 11 shows how to divide and transmit a control resource group using a plurality of sub-frames.

How to divide and allocate a resource from a control resource group is similar to how to divide and allocate a resource from the second traffic resource group.

The control resource group is divided into a first control resource group, a second control resource group, . . . , and a R-th control resource group having each resource number $M_1, M_2, \ldots,$ and $M_R$ for each control channel.

At this time, when the total resource number of the R-th control resource group is given as $M_R$, the unit group resource number is given as $G_{c,R}$, the first control resource group to the R-th control resource group is respectively formed by a unit resource group having $G_{c,r}$-numbered resources disposed at the same position of all the cells. At this time, the R-th control resource group includes $M_R/G_{c,R}$-numbered unit resource groups.

At this time, the $G_{c,r}$-numbered resources and $M_R/G_{c,R}$-numbered unit resource groups for forming the unit resource group are most uniformly dispersed on a frequency axis and time axis such that the channel response correlation diagram of the adjacent cells is minimized, and the frequency and time diversity gain and encoding gain of the desired cell are maximized.

The base station divides and transmits a control resource group most uniformly on the frequency axis and time axis as FIG. 11.

At this time, the base station may transmit control data of the control channel by an amount set to be equal for the respective cells to the mobile terminal, or may transmit the same by an amount set to be differently for the respective cells.

When the amount of control data of the control channel is set to be equal for the respective cells, the base station receives a previously allocated predetermined amount of resource from the control resource group and uses the same to transmit the control data.

When the amount of control data of the control channel is set to be different for the respective cells, the base station checks whether the second traffic resource group has excess resources when there are insufficient resources in the control resource group basically allocated for the control channel of the base station. When the second traffic resource group has excess resources, the resources of the second traffic resource group are allocated so as to transmit a control resource group. However, when the second traffic resource group has no excess resources, or the resources of the second traffic resource group is not enough to accommodate a control resource, the resources of the previously divided (1−1)-th preliminary traffic resource group are additionally allocated through a control of with the adjacent base station.

The control data transmitting method using the allocated channel resource is the same as the resource allocation method of the second traffic resource group and the traffic data transmitting method. However, the modulation and encoding method of the control channel may be previously fixed for the respective control channels, or determined by the base station and transmitted to the mobile terminal.

In addition, a control data symbol detecting method transmitted using a channel resource of the control resource group, the second traffic resource group, and the (1−1)-th preliminary traffic resource group is the same as the traffic data symbol detecting method transmitted through the second traffic resource group.

In the OFDM system, the user number of the cell boundary and the transmitted traffic amount are changed depending on the cell at which the mobile terminal is located, the intra-cell location thereof, and time. However, when amount of the first and second traffic resource groups allocated to each cell is not controlled, the receive performance may be decreased or the resources may not be effectively used.

In order to solve such a problem, the resources of the (1−1)-th preliminary resource group may be additionally allocated to the cell-boundary mobile terminal.

Figure 12:
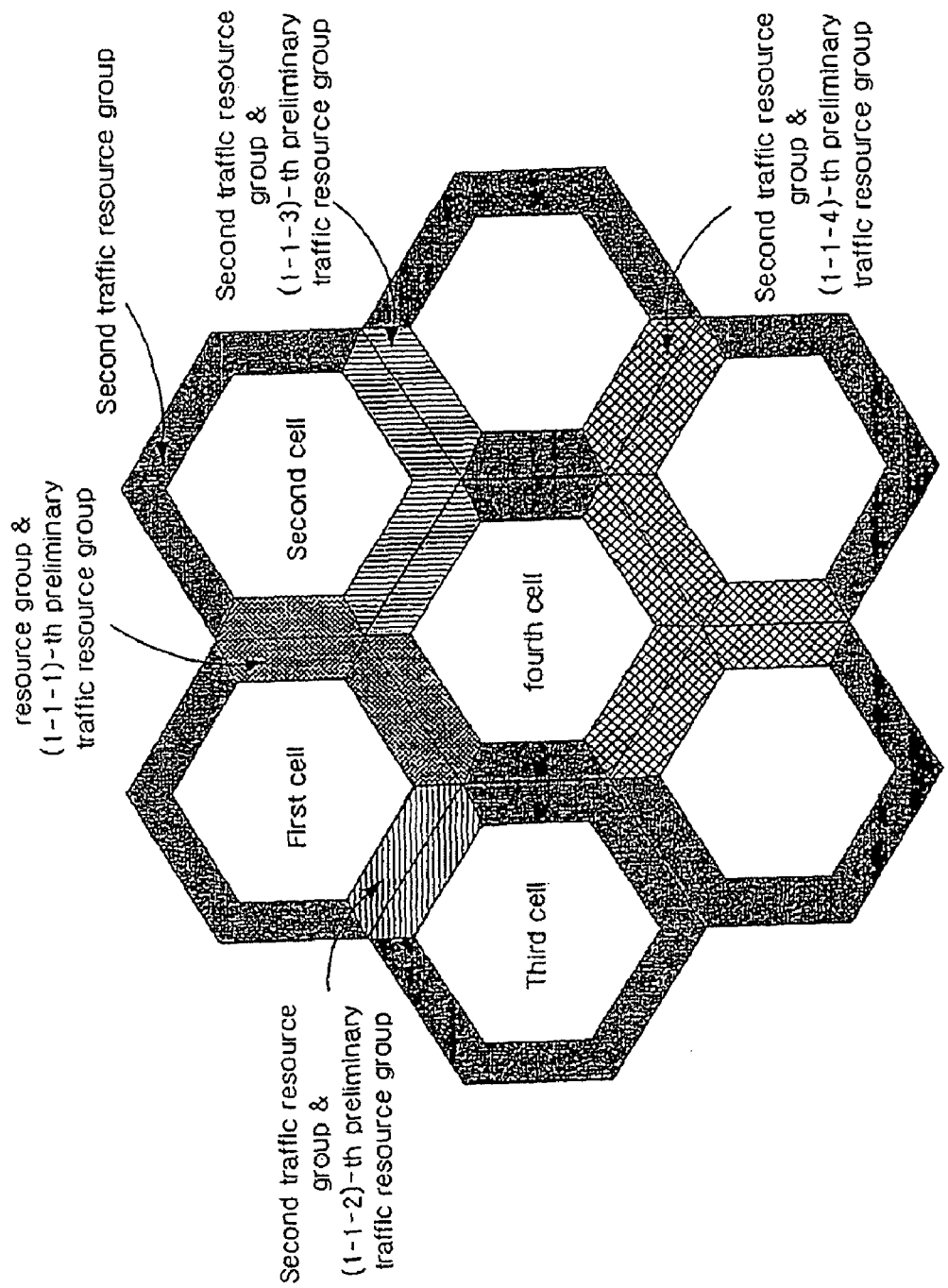
FIG. 12 shows how to additionally allocate a (1–1)-th preliminary traffic resource group at a boundary portion of the adjacent cell according to an exemplary embodiment of the present invention.

FIG. 12 shows how to additionally allocate a (1−1)-th preliminary traffic resource group at a boundary portion of the adjacent cell according to an exemplary embodiment of the present invention.

The amount of the second traffic resource group basically allocated to the mobile terminal largely undergone an inter-cell interference is appropriately established the second traffic resource group is given as a common resource group which be able to be allocated to all the cell-boundary mobile terminals regardless of the adjacent cell location.

When the traffic resource is transmitted to the mobile terminal which is located at the boundary of the predetermined adjacent cell, or the transmitted traffic amount is increased and accordingly, the excess traffic resource is insufficient, a part of the (1−1) preliminary traffic resource group is divided by the control of the adjacent base station, and the divided resource group is allocated to the mobile terminal of the adjacent cell boundary.

However, when the mobile terminal is depart from the cell boundary or the traffic amount is decreased, the allocated resource group is recovered by the control of the adjacent base station and is returned to the (1−1)-th preliminary traffic resource group.

Herein, a resource group control method between one base station and the adjacent base station is as follows.

When the base station determines that it is necessary to control a resource group because the intra-cell mobile terminal number and location are changed or the traffic amount is decreased or increased by a predetermined amount, it transmits a resource group control request signal to the adjacent base station to be controlled. At this time, the resource group control request signal transmitted to the adjacent base station includes a control specification for indicating addable or recoverable resource group.

When the adjacent base station receives the resource group control request signal, it may acknowledge and agree with the received resource group control request, and it may transmit new control contents to the base station and other adjacent base stations which the base station transmits the resource group control request signal.

At this time, when the adjacent base station agrees with the resource group control request, the base station is controlled in response t the transmitted resource group control request. However, when the adjacent base station generates a new control content and transmitted the same to the base station and other adjacent base stations, the base station and other adjacent base stations receives the new control content, acknowledges and agrees with the same or generates another new control content, and transmits the same to another base station. When all the base stations agree with the control content in this repeated manner, the resource group control is performed according to the control content.

At this time, in order to avoid inefficiency due to a long agreement time for the resource group control of a plurality of base stations, the agreement time or the exchange number of the control content may be limited.

In FIG. 12, the base station of the first cell and the base station of the second cell use the second traffic resource group and (1–1–1)-th preliminary traffic resource group so as to transmit a traffic to the first and second cell boundary mobile terminal.

In addition, the base station of the first cell and the base station of the third cell use the second traffic resource group and (1–1–2)-th preliminary traffic resource group so as to transmit a traffic to the first and third cell boundary mobile terminal.

In addition, the base station of the first cell may use the (1–1–1)-th preliminary traffic resource group or additional preliminary traffic resources so as to transmit a traffic to the first and fourth cell boundary mobile terminal.

In addition, the base station of the second cell may use the second traffic resource group and the (1–1–1)-th preliminary traffic resource group or additional preliminary traffic resources so as to transmit a traffic to the first cell boundary mobile terminal or may use the second traffic resource group and the (1–1–3)-th preliminary traffic resource group or additional preliminary traffic resources so as to transmit a traffic to the fourth cell boundary mobile terminal Though such a manner, each base station of each cell additionally allocates the (1–1)-th preliminary traffic resource group and transmits a traffic to the cell boundary mobile terminal.

A program for realizing functions corresponding to elements according to an exemplary embodiment of the present invention or the recording medium thereof are included in the spirit of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, radio resources may be reused in each downlink cell of the OFDM system, the traffic may be rapidly transmitted to the cell boundary mobile terminal, and a system capacity may be increased.

In addition, since the inter-cell interference problem is solved, the cell plane may be easily performed, and the system capacity may not be decreased although the mobile terminal number, locations, and traffic density is not uniform.

What is claimed is:

1. A resource division and allocation method for reducing an inter-cell interference of a downlink transmitted from a base station to an intra-cell mobile terminal in an orthogonal frequency division multiplexing (OFDM) cellular system, the resource division and allocation method comprising:
   (a) dividing entire downlink radio resources into a traffic resource group for a traffic channel and a control resource group for a control channel;
   (b) dividing the traffic resource group into a first traffic resource group for the intra-cell mobile terminals and a second traffic resource group for cell-boundary mobile terminals;
   (c) imaginarily dividing a part of the first traffic resource group as a (1–1)-th preliminary traffic resource group, the (1–1)-th preliminary traffic resource group being a preliminary resource group for the cell-boundary mobile terminal;
   (d) allocating the control resource group as a control channel for the intra-cell mobile terminal; and
   (e) allocating a resource of the first traffic resource group or the second traffic resource group as a traffic channel for the mobile terminal according to inter-cell interference affecting the mobile terminal.

2. The resource division and allocation method of claim 1, wherein the step (e) for allocating a resource of the first traffic resource group or the second traffic resource group to a traffic channel includes each intra-cell mobile terminal estimating a signal to interference ratio and a receive noise power and transmitting the estimated information to the base station; and,
   allocating the first traffic resource group to the mobile terminal when it is determined using the estimated information that the signal to interference ratio is greater than a reference value, and allocating the second traffic resource group to the mobile terminal when it is determined using the estimated information that the signal to interference ratio is less than a reference value the signal.

3. The resource division and allocation method of claim 1, wherein the step (e) for allocating a resource of the first traffic resource group or the second traffic resource group to a traffic channel includes the cell dividing the first traffic resource group in a format for averaging or reducing the inter-cell interference and allocating the divided first traffic resource group as a physical channel for the mobile channel.

4. The resource division and allocation method of claim 3, wherein a transmit power and a modulation and encoding scheme is selected in the physical channel formed by the first traffic resource group using at least one of the inter-cell interference strength, a signal-to-noise ratio (SNR), a channel gain, and a receive noise power affecting the mobile terminal.

5. The resource division and allocation method of claim 1, wherein the step (b) for dividing the traffic resource group includes dividing the second traffic resource group into a plurality of (2–K)-th traffic resource group having $N_K/(G_K$-numbered unit resource groups,
   (Herein, K is given as 1, 2, . . . , that is, a division number of the second traffic resource group, the $N_K$ is a total resource number of the (2–K)-th traffic resource group, the $G_K$ is a resource number of the unit resource group of the (2-K)-th traffic resource group).

6. The resource division and allocation method of claim 5, wherein the $G_K$ is disposed on the same frequency and the same time of all the cells in the orthogonal frequency division multiplexing cellular system.

7. The resource division and allocation method of claim 5, wherein the unit resource group is formed by any one of
a cluster-type resource allocation scheme that the $N_K$ numbered resources are divided into a plurality of consecutive resource groups on a frequency and a time axis and are formed as a plurality of resource block, and the unit recourse group is formed using the $G_K$-numbered resources in the one resource block;
a com-type resource allocation scheme that the $N_K$ numbered resources are divided into a plurality of consecutive resource groups on a frequency and a time axis and are formed as a plurality of resource block, and the unit resource group is formed by extracting $G_K$-numbered resources of the same location of each resource block; and
a block random-type resource allocation scheme that the $N_K$ numbered resources are divided into a plurality of consecutive resource groups on a frequency and a time axis and are formed as a plurality of resource block, and the unit resource group is formed by extracting $G_K$-numbered resources of random position of each resource block.

8. The resource division and allocation method of claim 5, wherein the step (e) for allocating a resource of the first traffic resource group or the second traffic resource group to a traffic channel includes
when the orthogonal frequency division multiplexing cellular system is operated using a plurality of divided sub-bands, selecting a sub-band which a channel gain of the mobile terminal is largest;
selecting a (2-A)-th traffic resource group appropriate for a channel characteristic of the mobile terminal from among the second traffic resource groups in the selected sub-bands; and
allocating the unit resource groups from the selected (2-A)-th traffic resource group as the physical channel, the unit resource groups having an average distance greater than a reference value on the frequency axis and the time axis.

9. The resource division and allocation method of claim 8, wherein a data symbol transmitted from the mobile terminal is copied by $G_K$-numbered times and the copied data symbols are loaded on the $G_K$-numbered resources of the physical channel allocated to the (2-A)-th traffic resource group.

10. The resource division and allocation method of claim 8, wherein when there is no sufficient resources in the (2-A)-th traffic resource group appropriate for a channel characteristic of the mobile terminal, resources are allocated from a (2-J)-th traffic resource group (where, J=1, 2, ..., K, and J≠A) to the physical channel, the (2-J)-th traffic resource group being included in the second traffic resource group and being different from the (2-A)-th traffic resource group.

11. The resource division and allocation method of claim 10, wherein
if $G_K < G_J$ (where, the $G_J$ is the number of resources of the unit group resources in the (2-J)-th traffic resource group), the $G_K$-numbered unit resource group allocated from the (2-J) traffic resource group is divided into $G_J/G_K$-numbered resource group, and the $G_K$-numbered symbols are allocated to the physical channel of the (2-J) traffic resource group using the divided $G_J/G_K$-numbered resource group,
and if $G_K > G_J$, the $G_K$-numbered repeat symbols are divided by a $G_J$ magnitude, and the divided repeat symbols are loaded on the physical channel of the $G_K/G_J$-numbered unit resource group in the (2-J) traffic resource group.

12. The resource division and allocation method of claim 1, wherein
the step (e) for allocating a resource of the first traffic resource group or the second traffic resource group to a traffic channel includes
dividing the (1-1)-th preliminary traffic resource group into a plurality of (1-1-B)-th traffic resource groups;
selecting the (1-1-B)-th traffic resource group appropriate for the channel characteristic of the mobile terminal when there is no sufficient resource in the second traffic resource group; and,
allocating the unit resource groups to the physical channel such that the selected (1-1-B)-th preliminary traffic resource group obtains a large encoding gain, the unit resource groups having an average distance greater than a reference value on the frequency and time axis.

13. The resource division and allocation method of claim 1, wherein
the step (e) for allocating a resource of the first traffic resource group or the second traffic resource group to a traffic channel includes when there is no sufficient resource in the second traffic resource group and the (1-1) preliminary traffic resource group, allocating a resource from the first traffic resource group to the physical channel and suppressing a transmit power so as to reduce inter-cell interference.

14. The resource division and allocation method of claim 1, wherein
the step (a) for the dividing entire downlink radio resources includes dividing the entire downlink radio resources into a plurality of R-th control resource groups having $M_R/G_{c,R}$-numbered unit resource groups
(where, R is 1, 2, ..., and is the number for dividing the control resource group, the $M_R$ is the total resource number of the R-th control resource group, and the $G_{c,R}$ is the number of the unit group resources included in the R-th control resource group).

15. The resource division and allocation method of claim 14, wherein
the $G_{c,R}$-numbered resources of the unit resource group and the $M_R/G_{c,R}$-numbered unit resource group are disposed maximum uniformly on the frequency axis and the time axis.

16. The resource division and allocation method of claim 14, wherein
the $G_{c,R}$-numbered resources of the unit resource group are allocated over several sub-frames or several time slots.

17. The resource division and allocation method of claim 14, wherein
when an amount of control data is fixed at the same value every cell, the resources of the R-th control resource group corresponding to the control resource group are allocated to the control channel, and
when an amount of control data is set to be different from each other every cell and there is no sufficient resource allocated in the R-th control resource group, it is determined whether there are the excess of the second traffic resource, and when is determined that there are the excess of the second traffic resource, the second traffic resources are allocated, and when it is determined that there are the excess of the second traffic resource, the (1–1)-th preliminary traffic resources are additionally allocated by means of the negotiation between the adjacent base station.

18. The resource division and allocation method of claim 1, wherein
when the cell-boundary mobile terminals are increased or the traffic is increased, a part of the (1–1)-th preliminary traffic resource group is divided by means of the negotiation between the adjacent base station and the divided (1–1)-th preliminary traffic resource group is allocated to the mobile terminal undergone a large inter-cell interference,
when the cell-boundary mobile terminals are decreased or the traffic is decreased, a part or an entire of the divided resource is recovered by means of the negotiation between the adjacent base station and the recovered resources are returned to the (1–1) preliminary traffic resource group.

19. A resource transmitting method for transmitting a resource from a base station to a mobile terminal by dividing and allocating a resource so as to reduce an inter-cell interference in an orthogonal frequency division multiplexing (OFDM) cellular system, the resource transmitting method comprising:
(a) dividing entire downlink radio resources into a traffic resource group for a traffic channel and a control resource group for a control channel;
(b) dividing the traffic resource group into a first traffic resource group for the intra-cell mobile terminals and a second traffic resource group for a cell-boundary mobile terminal;
(c) imaginarily dividing a part of the first traffic resource group into a (1–1)-th preliminary traffic resource group, the (1–1)-th preliminary traffic resource group being a preliminary resource group for the cell-boundary mobile terminal;
(d) allocating the control resource group to a control channel for the mobile terminal, and allocating resources of the first and second traffic resource group to a traffic channel of the mobile terminal; and
(e) transmitting a transmit data symbol to the mobile terminal using the traffic channel.

20. The resource transmitting method of claim 19, wherein the step (b) for dividing the traffic resource group includes dividing the second traffic resource group into a plurality of (2–K)-th traffic resource groups having $N_K/G_K$-numbered unit resource groups,
(Herein, K is given as 1, 2, ..., that is, a division number of the second traffic resource group, the $N_K$ is a total resource number of the (2–K)-th traffic resource group, the $G_K$ is a resource number of the unit resource group of the (2–K)-th traffic resource group).

21. The resource transmitting method of claim 20, wherein the step (d) for allocating the control and traffic resource groups includes when the orthogonal frequency division multiplexing cellular system is operated by a plurality of the divided sub-bands, selecting a sub-band which the channel gain of the mobile terminal is largest;
selecting a (2–A)-th traffic resource group appropriate for a channel characteristic of the mobile terminal from among the second traffic resource groups in the selected sub-bands; and
allocating unit resource groups from the selected (2–A)-th traffic resource group to a physical channel, the unit resource groups having an average distance greater than a reference value on the frequency and the time axis.

22. The resource transmitting method of claim 21, wherein a data symbol transmitted to the mobile terminal is copied by $G_K$-numbered times and the copied data symbols are transmitted using the $G_K$-numbered resources of the physical channel allocated from the (2–A)-th traffic resource group.

23. The resource transmitting method of claim 21, wherein when there is no sufficient resources in the (2–A)-th traffic resource group appropriate for a channel characteristic of the mobile terminal, resources are allocated from the (2–J)-th traffic resource group (where, J=1, 2, ..., K, and J≠A) to the physical channel, the (2–J)-th traffic resource group being included in the second traffic resource group and being different from the (2–A)-th traffic resource group.

24. The resource transmitting method of claim 23, wherein if $G_K < G_J$ (where, the $G_J$ is the number of resources of the unit group resources in the (2–J)-th traffic resource group), the $G_K$-numbered unit resource group allocated from the (2–J) traffic resource group is divided into $G_J/G_K$-numbered resource group and the $G_K$-numbered repeat symbols transmitted using the divided resource group,
and if $G_K > G_J$, the $G_K$-numbered repeat symbols are divided by a $G_J$ magnitude and the divided repeat symbols are transmitted using the $G_K/G_J$-numbered unit resource group in the (2–J) traffic resource group.

25. The resource transmitting method of claim 19, wherein the step (d) for allocating a resource of the first traffic resource group or the second traffic resource group to a traffic channel includes when there is no sufficient resource in the second traffic resource group and the (1–1) preliminary traffic resource group, allocating a resource from the first traffic resource group to the physical channel and suppressing a transmit power so as to reduce inter-cell interference.

26. The resource transmitting method of claim 19, wherein the step (e) for allocating a resource of the first traffic resource group or the second traffic resource group to a traffic channel includes determining a transmit power and a modulation and encoding scheme of the physical channel using one or more of the inter-cell interference strength, a signal-to-noise ratio (SNR), a channel gain, and a receive noise power affecting the mobile terminal and transmitting the transmit data symbol using the determined transmit power and modulation and encoding scheme.

27. The resource transmitting method of claim 19, further comprising before the step (e) for allocating a resource of the first traffic resource group or the second traffic resource group to a traffic channel, multiplying the transmit data symbol by a weight, value row for minimizing an effective channel response relation ratio of the repeat symbols of inter-cells and inter-sectors.

28. The resource transmitting method of claim 19, further comprising before the step (e) for allocating a resource of the first traffic resource group or the second traffic resource group to a traffic channel, multiplying the transmit data symbol by a weight value vector orthogonal to the respective cell or sectors with respect to the repeat symbols of inter-cells and inter-sectors.

29. The resource transmitting method of claim 19, further comprising after the step (e) for allocating a resource of the first traffic resource group or the second traffic resource group to a traffic channel,
(f1) determining whether to control a resource group by checking the change of the cell-boundary mobile terminal or traffic;

(f2) transmitting an control request signal and an control request details indicating to-be added or to-be recovered resource to at least one adjacent base station when it is determined that the resource group is needed to be controlled;

(f3) receiving an agreement to the control request signal and a new control request details from the at least one adjacent base station; and (f4) when the agreement to the control request signal is received, finishing the control process according to the control request details and when the new control details is received, advancing a negotiation until the base station and all the adjacent base station agree.

30. The resource transmitting method of claim 29, wherein the step (f4), when the negotiation to the new control details is not agreed by the base station and all the adjacent base station, further includes finishing the negotiation.

31. A data symbol receiving method for a cell-boundary mobile terminal receiving a divided and transmitted data symbol from a base station so as to reduce an inter-cell interference in an orthogonal frequency division multiplexing (OFDM) cellular system, the data symbol receiving method comprising:

(a) receiving a transmit data symbol transmitted from the base station using a traffic channel;

(b) checking a repeat symbol included in the transmit data symbol, and detecting and eliminating inter-cell interference using the repeat symbol; and, (c) detecting the data symbol by combining the detected signals;

wherein the step (a) receiving a transmit data symbol transmitted from the base station using a traffic channel includes receiving the transmit data symbol through a second traffic resource group allocated for the cell-boundary mobile terminal, wherein the second traffic resource group includes a plurality of (2−K)-th traffic resource group having NK/GK -numbered unit resource groups, (Herein, K is given as 1, 2, . . . , that is, a division number of the second traffic resource group, the NK is a total resource number of the (2−K)-th traffic resource group, the GK is a resource number of the unit resource group of the (2−K)-th traffic resource group).

32. The data symbol receiving method of claim 31, wherein the step (b) for checking a repeat symbol included in the transmit data symbol, and detecting and eliminating inter-cell interference using the repeat symbol includes detecting and eliminating inter-cell interference by checking the GK of the (2−K)-th traffic resource group the repeat symbol repeated by GK-numbered times from the transmit data symbol.

33. The data symbol receiving method of claim 32, wherein when there is no sufficient resources in the (2−A)-th traffic resource group and thus the transmit data symbol is transmitted using resources of (2−J)-th traffic resource group (where, J =1, 2, . . . , K, and J≠A) allocated to the physical channel, the (2−J)-th traffic resource group being included in the second traffic resource group, and different from the (2−A)-th traffic resource group, if GK<GJ (where, the GJ is the number of resources of the unit group resources in the (2−J)-th traffic resource group), detecting and eliminating inter-cell interference of GK/GJ-numbered resource group having the GJ-numbered resources, and if GK>GJ, detecting and eliminating inter-cell interference of the respective GK-numbered resource groups using the repeat symbol.

34. A non-transitory recording medium including a program for dividing, allocating, and transmitting a data symbol to a resource so as to reduce an inter-cell interference in an orthogonal frequency division multiplexing (OFDM) cellular system, the program comprising: a function for dividing downlink-entire radio resources into a traffic resource group for a traffic channel and a control resource group for a control channel; a function for dividing the traffic resource group into a first traffic resource group for intra-cell mobile terminals and a second traffic resource group for cell-boundary terminals; a function for imaginarily dividing a part of the first traffic resource group into a (1−1)-th preliminary traffic resource group as a preliminary resource group for the cell-boundary mobile terminals; a function for allocating the control resource group as a control channel for the mobile terminal and allocating a resource of the first traffic resource group or the second traffic resource group to the traffic channel for the mobile terminal; and a function for transmitting a transmit data symbol to the mobile terminal using the traffic channel.

35. A non-transitory recording medium including a program for a mobile terminal receiving a data symbol divided and transmitted so as to reduce an inter-cell interference in an orthogonal frequency division multiplexing (OFDM) cellular system, the program comprising: a function for receiving a transmit data symbol transmitted from the base station using a traffic channel; a function for checking a repeat symbol included in the transmit data symbol, and detecting and eliminating inter-cell interference using the repeat symbol; and a function for detecting the data symbol by combining the detected signals.

wherein the function for receiving a transmit data symbol transmitted from the base station using a traffic channel includes receiving the transmit data symbol through a second traffic resource group allocated for the cell-boundary mobile terminal, wherein the second traffic resource group includes a plurality of (2−K)-th traffic resource group having $N_K/G_K$ -numbered unit resource groups, (Herein, K is given as 1, 2, . . . , that is a division number of the second traffic resource group, the $N_K$ is a total resource number of the (2−K)-th traffic resource group, the $G_K$ is a resource number of the unit resource group of the (2−K)-th traffic resource group).

36. A radio resource structure for reducing an inter-cell interference of a downlink from a base station to an intra-cell mobile terminal in an orthogonal frequency division multiplexing (OFDM) cellular system, the radio resource structure comprising: a first traffic resource group for transmitting a traffic channel to the intra-cell mobile terminals; a second traffic resource group for transmitting a traffic channel to the cell-boundary mobile terminal; and, a control resource group for transmitting a control channel to the intra-cell mobile terminals; wherein the first traffic resource group includes a (1−1) preliminary traffic resource group imaginarily divided into a preliminary resource group for the cell-boundary mobile terminal.

* * * * *